Feb. 6, 1951 A. A. HOCHER 2,540,784
DETACHABLE BRACKET CONSTRUCTION FOR LIGHTING ARMS
Filed Jan. 21, 1950 2 Sheets-Sheet 1
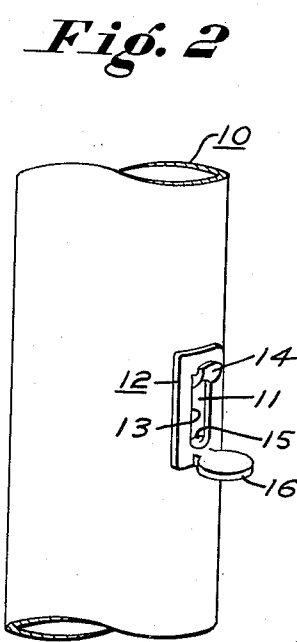
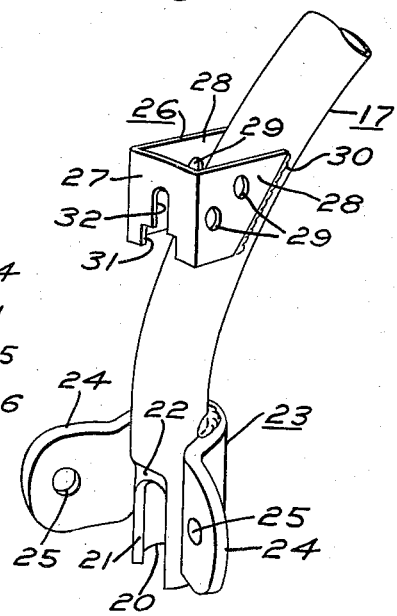
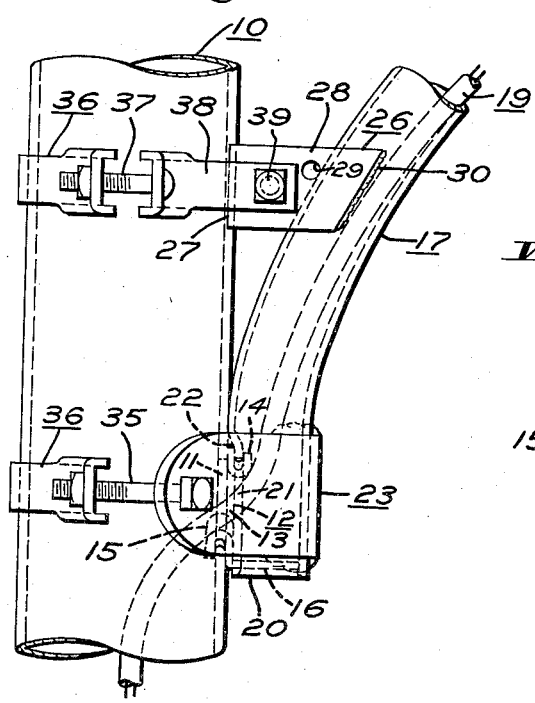
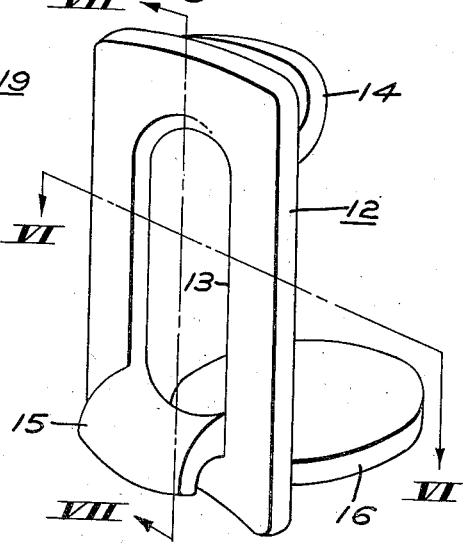
INVENTOR
Andrew A. Hocher
BY Green, McCallister & Miller
His Attorneys Feb. 6, 1951     A. A. HOCHER     2,540,784
DETACHABLE BRACKET CONSTRUCTION FOR LIGHTING ARMS
Filed Jan. 21, 1950     2 Sheets-Sheet 2
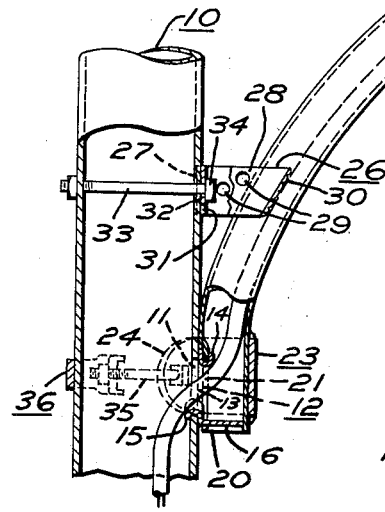
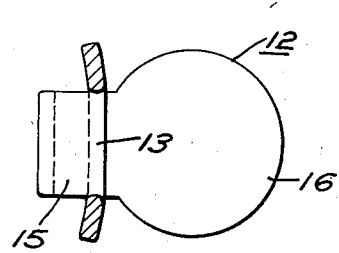
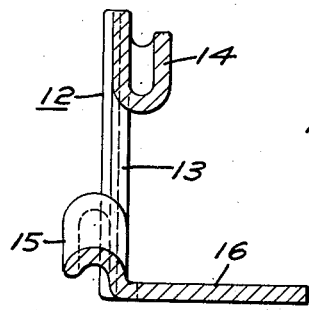
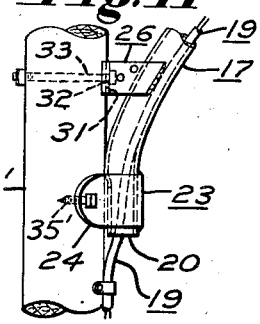
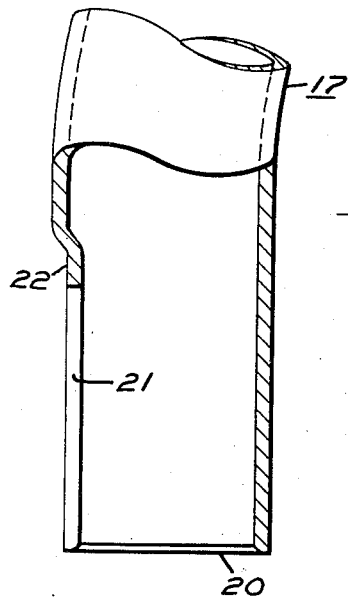
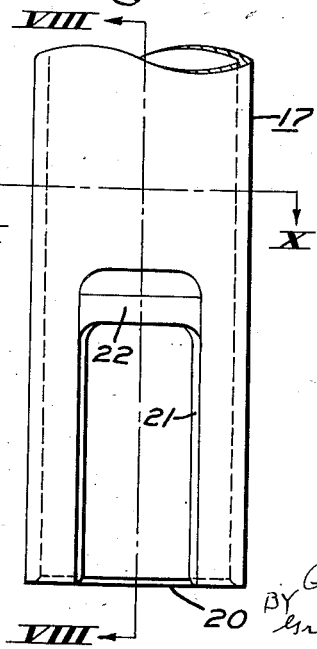
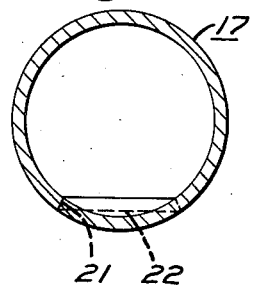
INVENTOR
Andrew A. Hocher
BY Green, McAllister & Miller
His Attorneys Patented Feb. 6, 1951

2,540,784

UNITED STATES PATENT OFFICE 2,540,784

DETACHABLE BRACKET CONSTRUCTION FOR LIGHTING ARMS

Andrew A. Hocher, Glenshaw, Pa., assignor to Hubbard and Company, Pittsburgh, Pa., a corporation of Pennsylvania Application January 21, 1950, Serial No. 139,894

15 Claims. (Cl. 248—221)

This invention relates to a new and improved overhead lighting bracket or fixture construction having an upsweep arm member adapted to be mounted on a pole or vertical upright. It deals particularly with an attachment or mounting construction of a universal type that is designed for employment with a hollow upright (such as a steel pole), but that may also be used with a solid upright (such as a wood pole).

Heretofore, it has been customary to provide a support construction for an overhead arm member of a type suitable for a particular form of vertical support or upright adapted for internal or external wiring. I have been able to devise an inexpensive and practical form of bracket construction of metal such that it can be readily used in connection with either a solid or hollow vertical upright and which will be much simpler and easier for the lineman to mount. Previous constructions for internal wiring have not been adaptable to other utilizations and have had inherent points of weakness such as to limit the size, weight, or sweep of the arm member that can be supported. The construction of my invention also does not require the open end of the sweep arm to be mounted perpendicular to the vertical upright or pole. The main portions of the attaching means of my invention may be integrally secured to a mounting portion of the arm member (adjacent its lower or inner end) in the factory and then mounted on any desired type of vertical upright, regardless of whether external or internal wiring is desired. Where internal wiring is desired, such as where the vertical upright is of hollow construction, I have provided an adapter means, part, or element which can be employed to further aid in the positioning and fastening of the bracket structure, to close or seal off the end of the arm member, and to provide an internal passageway for the cable or wiring employed. In accordance with my invention, the structure may utilize clamping bands, bolts, or lag screws to mount the sweep arm on the vertical upright. In addition, the structure is provided with an intermediate or upper attaching portion upon which the bracket structure can be loosely hung by the lineman preliminary to the final mounting operation. That is, the lineman does not have to carry the weight of the arm member during the securing operation by reason of this attaching portion.

It has thus been an object of my invention to provide a new and improved form of overhead bracket structure such as used in street and outside lighting;

Another object has been to devise an attaching means of substantially universal application to various requirements in the field;

A still further object has been to devise a fastening or clamping construction which will simplify the operation of mounting a lighting bracket or fixture on a vertical upright and will aid in better aligning its arm member in a proper mounted relationship thereon;

These and many other objects of my invention will appear to those skilled in the art from the illustrated embodiments thereof.

In the drawings Figure 1 is a fragmental vertical view in elevation showing a hollow vertical upright provided with a rectangular opening in accordance with my invention;

Figure 2 is a similar view showing the mounted relationship of an adapter part or element of my invention over the opening provided in accordance with Figure 1;

Figure 3 is a perspective view in vertical elevation showing two main or principal attaching portions of my construction which may be mounted or secured on a mounting portion of a sweep arm or member as by welding;

Figure 4 is a vertical detail view showing a bracket construction of my invention in a mounted relationship on a vertical upright, wherein clamping straps or bands and internal wiring are utilized;

Figure 5 is an enlarged perspective view in vertical elevation showing the specific construction of the adapter of Figure 2 which may be employed where a hollow pole or vertical upright is used;

Figure 4A is a view somewhat similar to Figure 4, but is sectioned through the pole to further illustrate my invention, particularly from the standpoint of means used to preliminarily support the weight of the arm member during the hanging or mounting operation and which means may be later employed as a further fastening means for the mounting portion of the arm member.

Figures 6 and 7 are sectional views taken along the lines VI—VI and VII—VII respectively of Figure 5 to further illustrate the adapter part or element;

Figure 8 is an enlarged side fragmental view in elevation and partial section illustrating how the lower end portion of the arm member is constructed in accordance with my invention; this figure is taken along the line VIII—VIII of Figure 9;

Figure 9 is an enlarged back fragmental view in vertical elevation taken at right angles to Figure 8;

Figure 10 is a horizontal sectional view taken along the line X—X of Figure 9;

Figure 11 is a vertical view in elevation illustrating how my construction may be employed where a solid pole or vertical upright is used.

Referring particularly to Figures 1 and 2, I have shown a hollow pole 10 provided with a rectangular opening or slot 11 through a side wall thereof and within which an adapter part or element 12 may be mounted in such a way that it frames the edges of the opening. The specific construction of the adapter 12 is shown particularly in Figures 5, 6, and 7. It has a vertical face plate portion which is rounded or curved to substantially correspond to the curvature of the pole or vertical upright 10 upon which it may be removably set or mounted. A substantially rectangular slot or opening 13 extends centrally within the face plate portion. The upper end wall of the slot 13 is provided with an outwardly and upwardly projecting lip or latching flange portion 14 that defines a mounting groove, slot, or offset with the front face wall of the face plate portion. The lower end wall of the opening or slot 13 is provided with a similar lip or latching flange portion 15 which projects backwardly and downwardly and defines a mounting groove, slot, or offset with the back face of the face plate portion. The two lips 14 and 15 may be formed integrally from metal which is pressed out to form the rectangular slot 13.

The lower end portion of the front face of the face plate portion of the adapter 12 is provided with a sealing foot or stop portion 16 that extends transversely-outwardly therefrom and is preferably of circular outline or disc-like shape to frictionally fit within and to close-off the lower open end of the outsweep arm member 17. The outwardly-extending foot portion 16 is preferably formed as an integral part of the face plate portion by making the face plate portion of greater longitudinal extent than needed, and then turning its end portion up and suitably shaping it.

The adapter 12, as shown particularly in Figures 2, 4, and 4A, is constructed in such a manner that its bent-over, lower lip or flange portion 15 may be hooked or latched over the lower bounding edge wall of the rectangular slot 11 in the pole 10 to abut against its inner wall portion. The adapter 12 may be mounted in position in the opening 11 by entering it adjacent the upper edge of the opening and moving it downwardly until its lower lip 15 latches over the bottom edge wall of the pole.

Referring particularly to Figures 3, 4, and 4A, the main or basic portions or elements of my fastening means or construction comprise an upper, U-shaped or open-end, box-like attaching portion or support piece 26 and a lower, U-shaped, attaching portion or clamping piece 23. The lower attaching portion 23 has a shaped, central body or band portion, preferably provided with a curvature corresponding to the curvature of the lower end of the mounting portion of the arm member 17. A pair of backwardly and outwardly extending ear or tab portions 24 are integral with the intermediate body portion and are provided with holes 25 therethrough to receive mounting bolts or lag screws, see Figures 4 and 11. The attaching portion 23 is permanently secured, as by a resistance weld, as a band about an outer wall portion of the arm member 17 in such a manner that its tab portions 24 will extend backwardly therefrom. The contour of the tab portions 24 will substantially correspond to the contour of the vertical upright 10 upon which the arm member 17 is to be mounted.

As shown particularly in Figure 3, the lower end of the mounting portion of the arm 17 is bifurcated and is provided with an open-end substantially rectangular, vertically-extending slot 21 in its back wall that extends to its vertical open end 20, see also Figures 8 and 9. The top edge wall portion 22 of the arm 17, adjacent the upper end of the slot 21, is shown as depressed, offset, or deformed inwardly to provide a shoulder (see also Figure 10) which, as shown in Figures 4 and 4A, is constructed to slide into or enter the groove or spacing formed by the bent-over, upper lip 14 of the adapter 12. This provides a latching relation between the adapter 12 and the arm member 17. It will be noted that the lip 14 is adapted to abut against an inner wall portion of the arm 17. The spacing of the lip 14 may be such as to provide a clamping action upon the deformed or offset shoulder 22 of the arm.

The tubular arm member 17 may be of any suitable or standard construction at its upper end 18, depending upon the type of luminaire that is to be supported thereby. It will be noted that the cable or wiring 19 extends or is inserted along the hollow interior of the arm member 17 and through the transverse opening provided by its slot 21 and the slot 13 in the adapter 12. It will be noted that the lips 14 and 15 provide rounded-off guides for the cable 19. This method may be employed where internal wiring is desired.

Where a solid vertical upright 10' as shown in Figure 11 is to be used, the adapter 12 may be eliminated and the wiring may extend downwardly through the open end 20 of the arm member and along the outside of the vertical upright.

As shown in Figure 3, the intermediate or upper box-like support piece or attaching portion 26 has a back wall 27 that is bifurcated or is provided with an enlarged open-end, bottom, rectangular slot 31 and a vertically-extending, somewhat rectangular, smaller, open-end slot 32 whose upper edge wall is preferably curved to correspond to the curvature of the bolt, lag screw, or transversely-extending mounting pin upon which the attaching portion 26 is to be mounted. Spaced-apart side walls or wings 28 are connected by or extend integrally and transversely from the back wall 27 and may be provided with diagonal forward edges that are adapted to be positioned on opposite side portions of the wall of the mounting portion of the arm member 17 and to be secured thereto by weld metal 30. Diagonally spaced-apart holes 29 extend through each side wall 28 to receive mounting bolts in one of two selected positions. It will be noted that the vertical mounting portion or length of the arm member 17 is defined or provided by the bend therein.

In mounting the bracket construction of my invention upon a hollow pole or vertical upright 10, I preferably utilize the adapter part 12 by first positioning it as shown in Figure 2. Then, as shown in Figure 4A, a bolt and nut assembly 33 (having a headed shank) may be loosely positioned to extend through opposite holes in the pole with its head portion 34 in a spaced relationship with respect to adjacent portions of the outer wall thereof. The lineman then raises the arm member 17, so that the entry or lower slot 31 of its upper bracket 26 enters between the bolt head portion 34 and the adjacent outer wall of the vertical member 10, and guides the attaching portion 26 of the arm member downwardly over the shank of the bolt assembly 33 until such shank enters the narrow slot 31. In this manner the arm member 17 may be preliminarily, loosely supported or hung on the transversely extending headed shank end of the vertical upright 10 before it is securely clamped or mounted thereon. If a solid vertical upright 10', as shown in Figure 11, is used a pin projection or bolt 33 may serve the same purpose.

When the adapter 12 is employed, the lineman may simultaneously align the slots 31 and 32 with the bolt assembly 33 and the slot 21 with the upper lip 14 of the adapter 12, see Figure 4A. The foot portion 16 of the adapter 12 slidably enters the slot 21 so that the lower open end 20 of the arm 17 is sealed or closed off against the entrance of foreign objects. The wiring cable 19 may be inserted in the manner shown in Figure 4A and is preferably inserted before the preliminary mounting of the arm 17 on the vertical upright 10.

After the preliminary mounting has been accomplished bent head bolt and nut assemblies 35 may be inserted through the mounting holes 25 of the lower attaching portion 23 and through ends of a mounting strap 36 which extends about the pole 10. In this manner, the lower portion 23 can be securely mounted in position on the upright 10 by tightening down the nuts of the bolt and nut assemblies 35. The bolt and nut assembly 33 is then tightened down to securely fasten the upper attaching portion 26 on the pole 10. If desired, the upper bracket 26 may be attached (as shown in Figure 4) by employing a clamping strap or band 36, a pair of nut and bolt assemblies 37, and a pair of backwardly-extending strap arms 38. The front ends of the strap arms 38 are shown constructed to receive a bolt and nut assembly 39 that can be positioned to extend through either pair of the oppositely-aligned holes 29 in the side walls 28 of the attaching portion 26. The bolt assembly 39 will thus enable the arm member 17 to be loosely or pivotally hung until the lower attaching portion 23 is positioned and fastened with respect to the upright 10 and may then be tightened-up along with clamping bolts 37 to securely fasten the upper attaching portion 26.

If, as shown in Figure 11, a solid pole or vertical member 10' is to be used, or if the wiring is to be externally led out from the arm member 17, the adapter 12 is discarded, the lower bracket 23 may be secured by lag screws 35' and the upper bracket 26 by the bolt or pin assembly 33.

From the above description of the illustrated embodiments of my invention, it will be apparent that my bracket construction has a universal application to meet various requirements in the field, since the adapter part 12 may be used or discarded as desired, and bolt and nut assemblies, strap pieces, lag screws, etc. may be used for mounting it on the vertical upright involved. The vertical upright can be of solid or hollow construction and if of hollow construction, the adapter 12 may be used, as shown, to close or seal off the lower end of the arm 17 and to provide an internal wiring arrangement.

A reservation is made in favor of my copending application, Serial No. 34,680, filed June 23, 1948, and entitled "Street-Lighting Fixture," as to subject matter disclosed but not claimed in the present application.

What I claim is:

1. An improved overhead lighting bracket construction adapted for mounting on a vertical upright member which comprises, an arm member having a bend providing a vertical mounting portion, said mounting portion having a bifurcated wall shaped to latch with a portion extending from the vertical upright, and attaching means extending from the mounting portion of said arm member to securely fasten said arm member on the vertical upright.

2. An improved overhead lighting bracket construction for mounting on a vertical upright member which comprises, an arm member having a slotted mounting wall portion, an adaptor adapted to extend from the vertical upright member and having a latching portion, and said slotted mounting wall portion being shaped to latch with the latching portion of said adaptor to position said arm member on the vertical upright member.

3. A construction as defined in claim 2 wherein, said slotted mounting wall portion is inwardly offset to receive said adaptor.

4. A construction as defined in claim 2 wherein, a foot portion extends outwardly from said adaptor to engage a lower end of the vertical upright member.

5. An improved overhead lighting bracket construction adapted for mounting on a hollow vertical upright having a slot in a wall thereof which comprises, an arm member having a mounting portion, an adapter having an inner clamping lip portion constructed and arranged to fit over an edge of the slot in the upright and to abut against an inner portion of its wall, said adapter having a cable by-pass opening therethrough, said adapter having an outer lip portion, and the mounting portion of said arm member having a bifurcated back wall constructed and arranged to be aligned with the opening in said adapter and to engage said outer lip portion thereof.

6. A construction as defined in claim 5 wherein, the mounting portion of said arm member has an open end, and said adapter has a projecting closure portion constructed and arranged to enter the open-end of said arm member and close it off.

7. A construction as defined in claim 5 wherein, said outer lip portion of said adapter extends outwardly adjacent an upper edge wall of the opening in said adapter and is constructed and arranged to abut against an inner portion of the bifurcated back wall of said arm member.

8. A construction as defined in claim 5 wherein, the bifurcated back wall of said arm member is offset to fit within said outer lip portion of said adapter.

9. An improved overhead lighting bracket construction adapted for mounting on a hollow vertical upright having a slot therein, a tubular arm member having a bend providing a mounting portion, an adapter provided with a vertically-extending opening defined by framing edge portions, a lip portion projecting backwardly from said adapter adjacent a lower framing edge of the opening therein and constructed and arranged to rest upon a lower edge wall of the slot and to project downwardly along an inner wall portion of the hollow vertical upright, an attaching portion extending about the mounting portion of said arm member and having projecting ears extending from the mounting portion and adapted to be fastened on the vertical upright adjacent the vertical slot therein, the mounting portion of said arm member having a bifurcated back wall defining an open-end vertical slot, and a lip portion projecting forwardly from said adapter and constructed and arranged to engage the bifurcated back wall of said arm member and position said arm member on said adapter and align said bifurcated back wall with the opening in said adapter.

10. A construction as defined in claim 9 wherein, the forwardly projecting lip portion of said adapter extends adjacent an upper framing edge of the opening in said adapter, and an upper edge portion of the bifurcated wall of said arm member has a shoulder constructed and arranged to fit within the forwardly projecting lip portion of said adapter.

11. A construction as defined in claim 9 wherein, the mounting portion of said arm member has an open end, a closure portion extends outwardly from said adapter and is adapted to slide upwardly along the bifurcated back wall and into the open end of said arm member to abut against an inner wall portion of said arm member.

12. A construction as defined in claim 9 wherein, an upper attaching portion extends backwardly from the mounting portion of said arm member in a spaced-apart relationship with respect to said first-mentioned attaching portion, and said upper attaching portion has a bifurcated back wall adapted to fit over a headed shank extending from the vertical upright.

13. A construction as defined in claim 12 wherein, said upper attaching portion has at least a pair of side holes extending therethrough, a clamping band is adapted to extend about the vertical upright, and a bolt and nut assembly is adapted to extend through a pair of said side holes and to fasten said clamping band to said upper attaching portion.

14. An improved lighting bracket construction adapted for mounting on a vertical upright having a slotted portion provided with framing edges which comprises, an arm member having a bend providing a mounting portion, a lower attaching portion extending about the mounting portion of said arm member and adapted to be fastened to the vertical upright, an upper attaching portion extending from the mounting portion of said arm member at a vertically spaced position with respect to said first-mentioned attaching portion and having a bifurcated back wall shaped to fit over a projection extending from the vertical upright and having a hole therethrough adapted to receive a bolt and nut assembly of a clamping means, an adapter having a bent-over portion adapted to latch on a bounding edge of the slotted portion of the vertical upright, the mounting portion of said arm member having an edge wall, and said adapter having a bent-over portion adapted to latch over the edge wall of the mounting portion of said arm member.

15. A construction as defined in claim 14 wherein, a foot portion extends horizontally outwardly from said adaptor to engage a lower end of said arm member.

ANDREW A. HOCHER.

No references cited.